Patented Sept. 4, 1951

2,566,514

UNITED STATES PATENT OFFICE 2,566,514

ALUMINUM ARTICLES COATED WITH HEAT-SEALABLE COMPOSITION

George H. Bischoff, Fort Devens, Mass., assignor to Monsanto Chemical Company, St. Louis, Mo., a corporation of Delaware No Drawing. Application September 10, 1948, Serial No. 48,754

3 Claims. (Cl. 117—122)

This invention relates to the preparation of coated articles. More particularly, this invention relates to the preparation of coated aluminum articles.

With the increased availability of aluminum, the possibility of using this metal for various purposes has been the subject of wide investigation. Certain of the possible uses involve coating the aluminum with an adherent film. For example, the use of aluminum foil for packaging purposes frequently necessitates applying to the foil a heat-sealable coating which is "non-blocking" under ordinary conditions, but at the same time is highly adherent to the foil. Such coatings fulfill the function of enabling a package comprising the foil to be effectively sealed by hot pressing together two foil surfaces having an intermediate layer of the adhesive coating.

It is an object of the invention to provide coated aluminum articles. It is a particular object of this invention to provide aluminum articles with highly adhesive coatings of polyvinyl butyral-nitrocellulose compositions.

These and other objects are attained according to this invention by coating aluminum with a polyvinyl butyral-nitrocellulose composition plasticized with a mono-ester of glycerin made with an aliphatic acid, said acid having 10–20 carbon atoms and containing ethylenic unsaturation.

The following examples are illustrative of the present invention, but are not to be construed as limitative thereof. Where parts are mentioned, they are parts by weight.

The method followed in the examples is to allow the nitrocellulose to soak in the ethanol until it is well softened and then add the ethyl acetate, followed by stirring and heating until the nitrocellulose is completely dissolved. The plasticizer is then added to the nitrocellulose solution and while rapidly agitating the resulting product, the polyvinyl butyral in finely divided form is quickly added. Stirring is continued until the viscosity is too high to permit easy stirring and then the viscous solution is allowed to stand at 50–60° C. to complete the solution of any undissolved polyvinyl butyral and to allow air bubbles to escape.

In applying the solution to aluminum foil, the foil is placed on a smooth rigid surface such as a sheet of plate glass moistened with water, toluene, alcohol or other liquid. The foil (0.001 inch thick) is smoothed out on the moistened glass and the coating solution is applied to the foil by means of a doctor blade to achieve an even coating. In the examples, the doctor blade is adjusted to give a coating thickness of 0.0015–0.002 inch after drying.

The coated foil is allowed to air dry for a short period of time until the coated surface is tack-free and then the coated foil is placed in a drier at 80° C. to remove the remaining solvent.

Prior to testing, the coated foil is conditioned by standing for at least 16 hours at 25° C. and 50% relative humidity.

For the purpose of evaluating the adhesion of the coatings of the invention, conditioned samples are cut into strips one inch wide and about six inches long. By moistening one end of these strips with ethyl acetate, the coating may be loosened and the stripping initiated. After severing the portion of the strip which is moistened with ethyl acetate, the specimen is clamped in a Scott-L5 tensile testing apparatus in which a 15-pound spring scale has been substituted for the dial recording mechanism normally installed on this tester. The portion of the foil from which the plastic coating is stripped as indicated above, is placed in the clamp which is attached to a 15-pound spring scale. The free plastic end is placed in the clamp on the movable carriage. The coated end of the specimen strip is held at right angles to the free foil and free plastic ends. In conducting the test, the foil is separated from the plastic at a constant rate.

The polyvinyl butyral used in the examples is made up of about 17–21% hydroxyl groups by weight calculated as polyvinyl alcohol, less than 3% acetate groups by weight calculated as polyvinyl acetate and the balance substantially butyraldehyde acetal. The polyvinyl butyral is made from a polyvinyl acetate of such a viscosity that a 7.5% solution by weight of the polyvinyl butyral in methanol has a viscosity of 160 centipoises at 20° C. Polyvinyl butyrals having other viscosities may be used, e. g., 25–300 centipoises under the same conditions.

The nitrocellulose used in the examples is of the so-called one-half second viscosity grade and contains approximately 11% nitrogen.

*Example 1*

| | Parts |
|---|---|
| Polyvinyl butyral | 100 |
| Nitrocellulose | 25 |
| Glyceryl mono-9-octadecenoate | 20 |
| Ethyl acetate | 50 |
| Ethanol | 400 |

The composition prepared as described above is found to have excellent adhesion to aluminum foil and to be greatly superior in this respect to compositions which differ only in that the glyceryl mono-9-octadecenoate is replaced by another plasticizer such as dibutyl sebacate, tricresyl phosphate, dioctyl phthalate, triethylene glycol dihexoate, etc. For example, the adhesion obtained with the product of Example I is more than twice that obtained when the composition contains dibutyl sebacate in place of glyceryl mono-9-octadecenoate.

*Example II*

| | Parts |
|---|---|
| Polyvinyl butyral | 100 |
| Nitrocellulose | 25 |
| Glyceryl mono-9-octadecenoate | 10 |
| Dibutyl sebacate | 10 |

The resulting composition is found to possess good adhesion characteristics when applied to aluminum articles such as aluminum foil. While the adhesion values are somewhat lower than those of the product of Example I, they are still far higher than those obtained in otherwise identical compositions in which dibutyl sebacate is the sole plasticizer.

*Example III*

Example I is repeated except that the plasticizer is glyceryl monoundecenoate and the resulting composition is found to have an adhesion to aluminum comparable to that of Example I.

*Example IV*

Example I is repeated except that the plasticizer is glyceryl mono-12-hydroxy-9-octadecenoate. Similar adhesion to aluminum is obtained with the composition.

*Example V*

Example I is repeated except that the amount of nitrocellulose is raised to 50 parts and the amount of glyceryl monooctadecenoate is raised to 40 parts. The resulting composition is found to have an adhesion to aluminum which is even better than that of the product of Example I.

As indicated hereinbefore, numerous variations may be introduced into the compositions of the invention and the methods of applying the coating compositions without departing from the spirit of the invention. Thus, nitrocellulose having various viscosity characteristics may be used, for example, from ¼-second to 100-second nitrocellulose. The nitrocellulose used may be that customarily employed in either the plastics or coating industries. These nitrocellulose products usually have a nitrogen content of about 10.5–12.5%. Low viscosity nitrocellulose, e. g., ½-second, is preferred when the acetal resin has a viscosity (as defined above) of 100 centipoises or above. The viscosity values given herein for nitrocellulose are determined by A. S. T. M. Method D301–33.

The polyvinyl butyral employed may be varied substantially as regards its physical and chemical characteristics. Thus, the polyvinyl butyral may be made from polyvinyl acetate having varying viscosities, e. g., 1-molar benzene solutions thereof may have viscosities of 5–500 centipoises at 20° C. with the result that solutions of the polyvinyl butyral vary substantially in viscosity. The hydroxyl group and ester content of the polyvinyl butyral is also subject to considerable variation. Usually, it is found that the polyvinyl butyral should contain at least 5% hydroxyl groups by weight calculated as polyvinyl alcohol and generally, not more than 30%. A preferred range is 10–25% hydroxyl groups calculated as polyvinyl alcohol. The acetate or other ester group content of the polyvinyl acetal may also vary substantially. Thus, the ester group content may be entirely eliminated, or there may be as much as 30–35% ester groups by weight calculated as polyvinyl ester.

As indicated by the examples, the relative proportions of acetal resin, nitrocellulose and plasticizer may be substantially varied. Usually it is found that at least 5 parts of the partial ester are desirable for every 100 parts of acetal resin and for most applications not more than 50 parts are generally used. As indicated by Example II, a portion of the partial ester may be replaced by another plasticizer such as those mentioned above, but for maximum adhesion characteristics, this practice should not be followed. In any event, at least 5 parts of the partial ester should be present and a preferred range is 20–40 parts for every 100 parts of polyvinyl butyral.

As regards the nitrocellulose, the use of less than 15 parts for every 100 parts of acetal resin is to be avoided in general, but satisfactory compositions may be made which contain as much as 60 parts, particularly when a relatively high content of plasticizer is used. Thus, as regards the relative proportions of nitrocellulose and plasticizer, the amount of neither of these components should exceed the amount of the other by more than 50% for best results. A preferred range of proportions of nitrocellulose is 20–50 parts for every 100 parts of polyvinyl butyral.

The partial ester plasticizers used in the compositions of the invention are monoesters of glycerin made with aliphatic carboxylic acids containing ethylenic unsaturation and from 10 to 20 carbon atoms. Examples of acids from which these esters may be made include monoolefinic unsaturated aliphatic acids such as 7-hexadecenoic acid, 10 undecenoic acid, 13-docosanoic acid, and 9-octadecenoic acid; diolefinic-unsaturated aliphatic acids such as 9,12-octadecadienoic acid; triolefinic-unsaturated aliphatic acids such as 9,12,15-octadecatrienoic acid, 9,11,13-octadecatrienoic acid; substituted olefinic acids, for example, such hydroxy olefinic acids as 16-hydroxy-7-hexadecenoic acid and 12-hydroxy-9-octadecenoic acid; halogenated unsaturated acids, for example, monochloro-9-octadecenoic acid, monochloro-12-hydroxy-9-octadecenoic acid and halogenated acids derived by dehydration of castor oil acids followed by chlorination.

Mixtures of glyceryl monoesters of unsaturated aliphatic acids may be employed and when desired, mixtures of the foregoing unsaturated esters with glyceryl monoesters of saturated aliphatic acids, as for example, esters derived from the mixtures of acids occurring in various oils, as for example, linseed, castor, tung, soya bean, perilla, corn, cotton seed, sunflower, safflower, sesame, poppy seed, walnut, peanut, olive, rape seed, whale and dehydrated castor oils. The acids derived from these oils consist predominantly of unsaturated acids containing 18 carbon atoms. For certain purposes, partial esters may be used which are made of the mixtures of acids occurring in oils such as palm kernel oil, cocoanut oil and the like, which mixtures of acids contain substantial amounts of unsaturated acids such as those mentioned above, but do not predominate therein.

According to a particular embodiment of this invention, the esters employed are glyceryl monoesters of the unsaturated acids present in the oils mentioned above, for example, glyceryl-mono-12-hydroxy-9-octadecenoate, glyceryl-mono-9,12-octadecadienoate, glyceryl-mono-9,12,15-octadecatrienoate, glyceryl-mono-9-octadecenoate and the like.

When desired, mixtures of these and other types of plasticizers may also be included in the compositions, examples of which are well known to those skilled in the art.

While the invention has been illustrated with respect to aluminum foil having a thickness of 0.001 inch, it is obvious that aluminum articles having other thicknesses and/or other shapes may be coated in accordance with the invention to provide adherent coatings therefor having heat-sealable properties.

The thickness of the coating which is applied to the aluminum foil or other aluminum article may also be varied to meet particular requirements. However, for most requirements, a thickness of 0.0005-0.005 inch is sufficient for packaging purposes.

In place of the mixture of ethanol and ethyl acetate used in the examples, other solvents for the components of the coating composition may be used. For example, the ratio of ethanol to ethyl acetate may be raised as high as 99:1, or ethanol alone may be used. Also, along with the ethanol and ethyl acetate, such solvents may be incorporated as isopropanol, amyl alcohol, butanol, hexanol, octanol, toluene, etc. Other suitable solvents will be apparent to those skilled in the art.

In addition to the exceptional adhesion to aluminum of the coatings of the invention, they are characterized by the ability to heat seal in a short time (3-10 seconds) under moderate pressures (1-3 pounds per square inch) and elevated temperatures, e. g. 175° C. Furthermore, these coatings are "non-blocking" at ordinary temperatures, (or even at moderately raised temperatures), i. e., they do not prematurely adhere, for example, when articles coated therewith are in storage.

Another valuable property of the coating compositions is their excellent strength characteristics as reflected in the high tensile strength of free films thereof and their high heat seal strength.

While the invention has been illustrated by examples showing incorporation of the individual components of the compositions in the solvent, other procedures may be used for combining the several ingredients. For example, the plasticizer may be admixed with the polyvinyl butyral and the resulting plasticized polyvinyl butyral then admixed with the nitrocellulose solution. It is preferred to dissolve the nitrocellulose in the solvent or one or more components thereof, rather than attempt to dissolve the nitrocellulose in a solution of the polyvinyl butyral. A further alternative is to dissolve separately the nitrocellulose and the polyvinyl butyral and then combine the solutions. The plasticizer may be incorporated in either solution, or partly in both.

Instead of applying the compositions on the aluminum from solution, they may be applied in the absence of solvent by the application of heat, with or without pressure. Of course, in the preparation of the compositions, a certain amount of solvent is desirable for purposes of safety while incorporating the nitrocellulose. This solvent may be eliminated before or after the application to the aluminum.

It is obvious that many variations may be made in the products and processes of this invention without departing from the spirit and scope thereof as defined in the appended claims.

What is claimed is:

1. An aluminum article having a highly adhesive heat-sealable coating thereon comprising, on a weight basis, 100 parts of polyvinyl butyral, 15-60 parts of nitrocellulose and 5-50 parts of a monoester of glycerin made with an aliphatic carboxylic acid containing ethylenic unsaturation and more than 9 but less than 21 carbon atoms.

2. An aluminum foil having a highly adhesive heat-sealable coating on a surface thereof, said coating comprising on a weight basis, 100 parts of polyvinyl butyral, 15-60 parts of nitrocellulose and 5-50 parts of a monoester of glycerin made with an aliphatic carboxylic acid containing ethylenic unsaturation and more than 9 but less than 21 carbon atoms.

3. A product as defined in claim 2 in which the coating contains 20-50 parts of nitrocellulose and 20-40 parts of a monoester of glycerin made with an aliphatic carboxylic acid containing ethylenic unsaturation and more than 9 but less than 21 carbon atoms.

GEORGE H. BISCHOFF.

REFERENCES CITED

The following references are of record in the file of this patent:

UNITED STATES PATENTS

| Number | Name | Date |
| --- | --- | --- |
| 2,147,772 | Kallander | Feb. 21, 1939 |
| 2,433,097 | Debacher | Dec. 23, 1947 |
| 2,442,936 | Rohdin | June 8, 1948 |